Nov. 3, 1959　　　　　　　M. OLLEY　　　　　　2,911,052
INDEPENDENT REAR SUSPENSION FOR VEHICLES
Filed May 18, 1956　　　　　　　　　　3 Sheets-Sheet 1

INVENTOR
Maurice Olley
BY
Paul Fitzpatrick
ATTORNEY.

Nov. 3, 1959  M. OLLEY  2,911,052
INDEPENDENT REAR SUSPENSION FOR VEHICLES
Filed May 18, 1956  3 Sheets-Sheet 2

INVENTOR.
Maurice Olley
BY Paul Fitzpatrick
ATTORNEY.

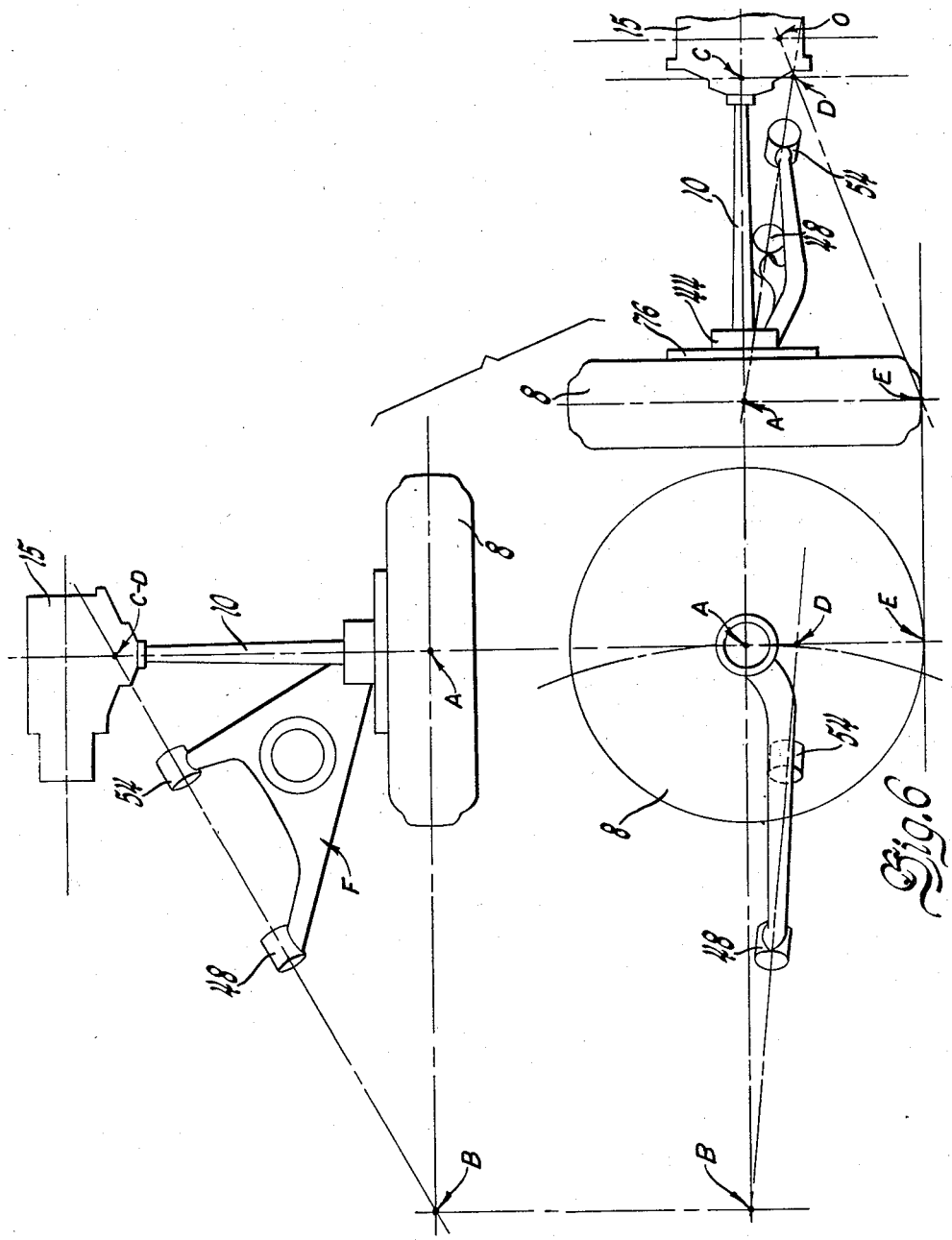

United States Patent Office 2,911,052
Patented Nov. 3, 1959

2,911,052

INDEPENDENT REAR SUSPENSION FOR VEHICLES

Maurice Olley, Detroit, Mich., assignor to General Motors Corporation, Detroit, Mich., a corporation of Michigan Application May 18, 1956, Serial No. 585,773

6 Claims. (Cl. 180—73)

This invention relates to vehicle suspension and more particularly to independent rear wheel suspension.

Suspension designers have long recognized that certain basic advantages are achieved by independently suspending the rear or driving wheels of a vehicle. Although numerous forms of independent rear wheel suspension have been proposed in the past, each possessed various disadvantages which have prevented widespread adoption of any single form. Of the numerous forms heretofore proposed, the so-called swing axle independent suspension has been particularly popular for various reasons, among which is the relatively low cost involved compared with other known types. In the most common form of swing axle independent suspensions, each driving wheel is rotatably mounted on a single generally transversely extending swing arm which is hinged on a horizontal axis adjacent the differential housing. A half axle, universally connected with the differential, extends outwardly from the housing thereof and drivingly engages the wheel. Because the axis of the swing arm intersects the center of the universal joint, a second universal joint between the half axle and wheel is not required. While this type of suspension has enjoyed a certain measure of success, particularly in the relatively small vehicles popular in Europe, it nevertheless possesses certain inherent disadvantages which have thus far prevented widespread acceptance. In particular, the ordinary swing axle, under severe lateral forces produced by cornering, tends to lift the rear end of the vehicle, so that both wheels assume severe positive camber positions to such an extent that the vehicle not only "oversteers" but actually tends to roll over. In addition, the effect is non-linear and increases suddenly in a severe turn, thus presenting potentially dangerous vehicle handling characteristics.

An object of the present invention is to provide an improved independent rear suspension.

Another object is to provide an improved swing axle rear suspension.

A further object is to provide an independent rear suspension in which each wheel is mounted on a single swing arm, which is required to absorb only braking torque and lateral thrust.

Still another object is to provide a swing axle independent rear suspension having geometry of motion adapted to reduced the roll couple carried by the wheels and, therefore, reduce the tendency of the vehicle to "oversteer."

Yet another object is to provide a suspension of the type referred to in which the axis of motion of each wheel extends diagonally as seen in plan view and in which the same axis is inclined downwardly and rearwardly as seen in side elevation, thus reducing the tendency of the rear end of the vehicle to "oversteer."

Still a further object is to provide in a suspension of the stated character an improved resilient mounting for the drive line and differential of the vehicle.

A still further object is to provide a suspension of this stated character which is simple in construction, low in cost and efficient in operation.

These and other objects, advantages and features of the invention will become more fully apparent as reference is had to the accompanying specification and drawings wherein:

Fig. 6 is a schematic representation of Figs. 1, 2 and 3 illustrating the geometry of motion produced by the present invention.

Figure 1:
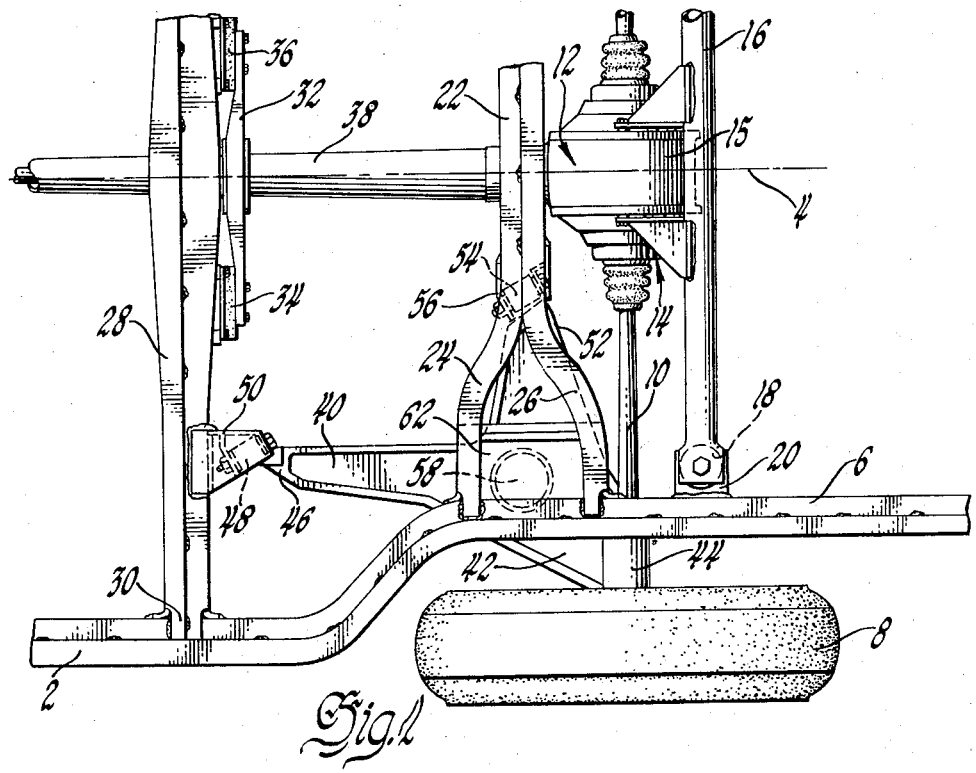
Fig. 1 is a fragmentary plan view of the left rear portion of a vehicle illustrating the structure and arrangement of the invention.
Figure 2:
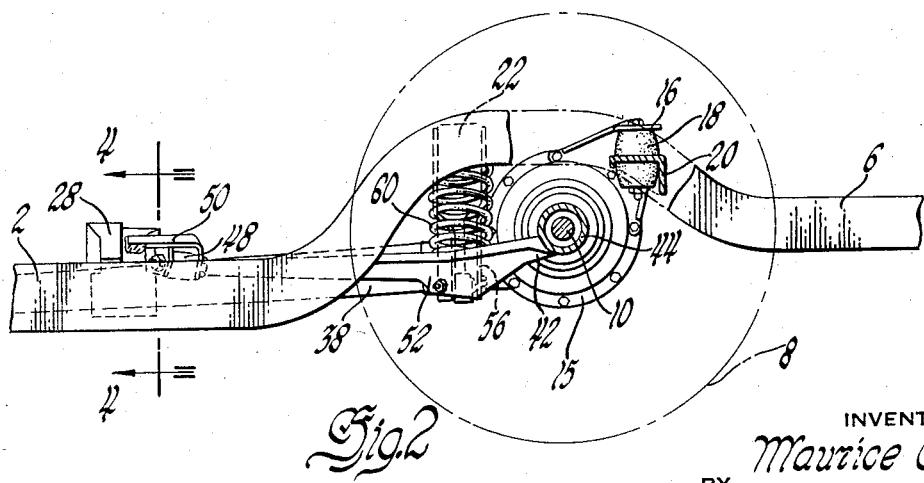
Fig. 2 is a fragmentary side elevational view of the structure shown in Fig. 1.
Figure 3:
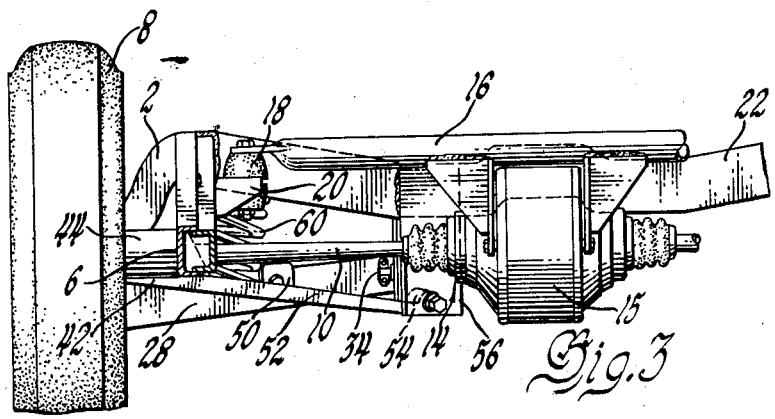
Fig. 3 is a fragmentary rear elevational view of the structure shown in Figs. 1 and 2.
Figure 4:
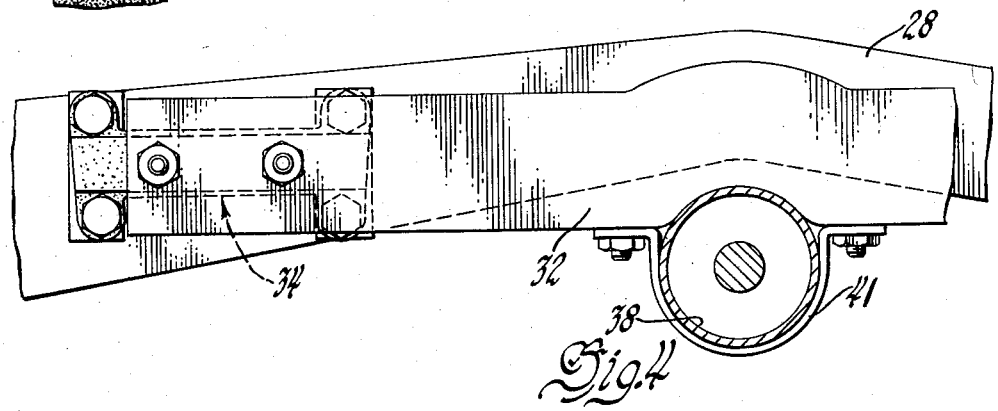
Fig. 4 is an enlarged fragmentary view looking in the direction of arrows 4—4 of Fig. 2.

Referring now to the drawings and particularly Fig. 1, the reference numeral 2 designates generally the left side frame member of the vehicle chassis. It will be understood that the chassis is symmetrical with respect to the longitudinal centerline 4 of the vehicle and that an opposite side frame member, not shown, is disposed at the opposite side of the vehicle parallel with member 2. For the purposes of the present invention, the structure relating to suspension of the left rear wheel only will be described, it being understood that the right rear wheel suspension is identical thereto but in the reverse sense. Near its rearward end, side frame member 2 is swept inwardly and terminates in a trailing portion 6. Spaced laterally outwardly from portion 6 is the left rear driving wheel 8. Drivingly engaging wheel 8, in a manner shortly to be described, is a half axle 10, the inner end of which is operatively connected to a differential mechanism 12 by means of an axially slidable or other suitable universal coupling 14. For a complete description of a suitable axially slidable joint, reference may be had to U.S. Patent 1,847,749, Bussien. The housing 15 of differential 12 is suspended from the vehicle frame by means of a transversely extending supporting tube 16. Tube 16 is resiliently connected at each end to the vehicle frame by means of rubber mountings 18 which, in turn, are connected to brackets 20. Brackets 20, in turn, are secured to and extend inboard of portion 6 of the side frame members 2. Spaced immediately forwardly of differential housing 15 and extending transversely of the vehicle is a frame cross member 22. At its opposite ends cross member 22 is forked to provide legs 24 and 26, the terminal ends of which are welded to portion 6 of side frame member 2. Spaced forwardly from cross member 22 is a second cross member 28, the opposite ends of which are welded or otherwise rigidly connected to side frame members 2 as illustrated at 30. Spaced slightly rearwardly from cross member 28 is a transversely extending supporting bracket 32 which is resiliently connected at its opposite ends to member 28 by means of rubber mounts 34 and 36. At its midportion bracket 32 is connected to the drive line torque tube 38 by means of a depending U-shaped bracket 41. It will thus be seen that drive line 38 and differential 12 are resiliently suspended at four spaced points from the vehicle frame by means of rubber mounts 20, 34 and 36.

In accordance with one feature of the invention, wheel 8 is pivotally supported for generally vertical movement relative to the vehicle frame by means of a generally Y-shaped pressed metal wishbone arm 40. Arm 40 has its outer end 42 rigidly secured, as by welding, to a cylindrical wheel bearing support member 44. At its inner forward end 46, wishbone arm 40 is provided with an integral bushing or sleeve 48 which is pivotally connected to a rearwardly and downwardly extending bracket structure or sleeve engaging portion 50 formed on cross member 28. The rearward inner end 52 of wishbone arm 40, in turn, is formed with a second integral bushing sleeve 54 which is pivotally secured to a depending bracket 56 formed on cross member 22. Centrally thereof, wishbone arm 40 is formed with a depression 58 which serves to locate the lower end of a coil spring 60 or other suitable spring. The upper end of spring 60, in turn, engages a plate 62 extending between the legs 24 and 26 of cross member 22 to resiliently support the sprung mass relative to the wheel 8. It will be understood that the invention is not limited to a construction utilizing any particular form of elastic mechanism, and that the coil spring is shown by way of illustration only.

In accordance with another feature of the invention, the pivotal connections between the inner forward end of wishbone 40 and bracket 50 and the inner rearward end thereof with bracket 56 are so arranged that the axis defined thereby tends to reduce the tendency of the vehicle to oversteer and also significantly reduces the tendency of the rear end to lift in turn. As seen in Fig. 6, the axis BD about which the arm 40 swings is swept inwardly and rearwardly in plan view and inclines rearwardly and downwardly in side elevation so that the center D, which is the virtual center of the arm 40 in the transverse plane of the wheel, is lower than the wheel center A by a distance CD. This correspondingly lowers the wheel center O. As a result, the roll couple carried by the rear wheels 8 is significantly reduced, as is the tendency of the vehicle to "oversteer." In addition, by inclining the swing axis so that it passes below the wheel center A, the tendency of the rear end of the vehicle to lift is significantly reduced. Tests have shown that by dropping the swing axis only a few inches, significantly improved results are obtained. By way of illustration, in the embodiment shown, where the center B is approximately 40 to 45 inches ahead of the wheel center A, excellent results are obtained when the distance CD is approximately 4 inches. With the geometry of the wishbone arm so arranged, the tendency of the vehicle to roll over in sharp turns is greatly reduced.

It will also be seen that the center B, which is the virtual center of motion of the rear wheel in side elevation, is level with but spaced substantially forwardly of wheel center A. Thus, the virtual radius arm of wheel motion in side elevation is AB. This arrangement results in the wheels, during normal deflection, remaining as nearly as possible parallel with the vehicle in plan view, with the tendency to toe-in occurring only at extreme compression and rebound. In addition, the virtual radius arm AB is of sufficient length to provide valuable resistance to lifting of the rear end when the brakes are applied.

Figure 5:
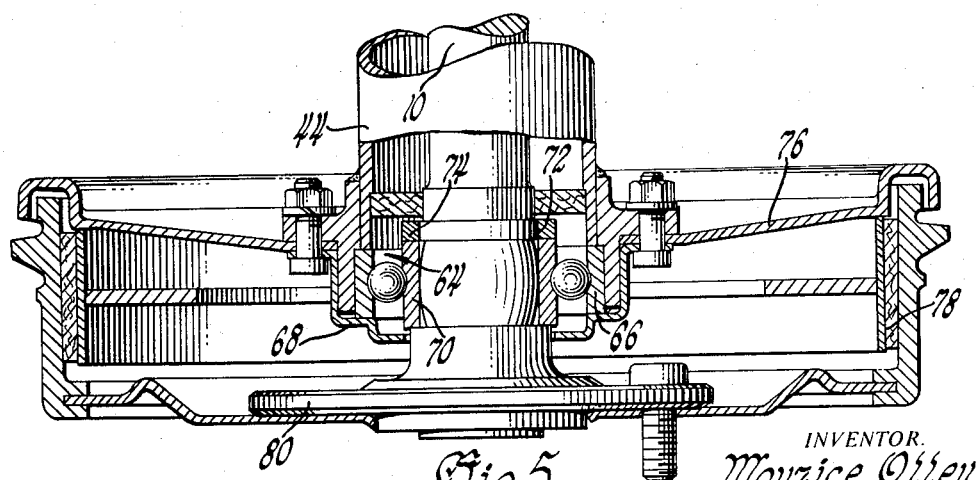
Fig. 5 is an enlarged sectional view showing the structure and arrangement of the wheel bearing support, and the mode of interconnection between the half axle and wheel.

As pointed out previously, the inner ends of half axles 10 are preferably connected to the differential 12 by means of pot type universal joints. Because the axis BD does not pass through the center of the universal joint, limited sliding of the half axle relative to the differential occurs. This motion is readily accommodated by pot type universal joints. During rise and fall of wheel 8, half axle 10 and wishbone 40 described slightly dissimilar arcs. Therefore, according to another feature of the invention, the wheel bearing 64 and the outer end of half axle 10 are so constructed as to accommodate such small changes as occur at extreme compression or rebound positions of the wheel. As seen in Fig. 5, bearing 64 is formed with an outer ball race 66 which is clamped in cylindrical bearing support 44 by retainer 68. Inner race 70 surrounds the enlarged portion 72 of half axle 10. A ring 74 engages portion 72 to prevent any substantial axial displacement of axle 10 relative to support 44. To permit slight relative angular inclination between support 44 and axle 10 without affecting normal bearing operation, the enlarged portion 72 may be slightly parabolic or barrel shaped in cross section as shown in exaggerated form in Fig. 5. It will, of course, be apparent that numerous other forms of bearings may be substituted for bearing 64, such as for example the commercially available SKF spherical bearing. However, maximum angular variation of half axle 10 throughout its maximum range of movement is extremely small, tests having shown that suspension arranged according to the illustrated embodiment requires a tolerance to angular variation of only 48″.

In order to take advantage of the virtual radius arm AB in resisting rearing up of the sprung mass during braking, the brake anchor plate 76 and shoes 78 are preferably mounted on wheel bearing support 44 adjacent wheel 8.

Because the wheels 8 are rigidly connected to integral end flanges 80 of half axles 10, the wheels carrying wishbone arms 40 are not required to maintain wheel alignment, as is the case where universal joints are employed both at the inner and outer ends of the half axle. It, therefore, follows that wishbone arms 40 and their supporting members 50 and 56 may be reduced considerably in weight and strength, thus effecting further economies in construction.

From the foregoing it will be seen that an improved swing axle independent rear suspension has been provided. Among the numerous advantages of the suspension are the provision of a low roll center in a swing axle construction, vertical motion of the wheel center at design height and parallel wheel movement at design height. In addition, the construction provides a virtual radius arm which is effective, when the brakes are applied, to resist rearing up of the sprung mass. Further, all of the foregoing advantages are accomplished by means of wheel guiding members of relatively light and inexpensive construction.

While but one embodiment of the invention has been shown and described, it will be evident that numerous changes and modifications may be made therein. It is, therefore, to be understood that it is not intended to limit the invention to the embodiments shown but only by the scope of the claims which follow.

What is claimed is:

1. In a motor vehicle having a frame, a differential drive mechanism resiliently supported on said frame, a half axle having one end universally connected to said differential mechanism, a wheel rigidly connected at the other end of said half axle, means rotatably supporting said other end of said axle, a suspension arm, means rigidly connecting the outer end of said arm to said supporting means, and spaced apart means pivotally connecting the inner end of said arm to said vehicle for swinging movement about an oblique inclined projected axis passing vertically below the center of said universal connection between said half axle and said differential mechanism.

2. In a motor vehicle having a frame, a differential drive mechanism resiliently supported on said frame, a half axle having one end universally connected to said differential mechanism, a wheel rigidly connected at the other end of said half axle, means rotatably supporting said other end of said axle, a suspension arm, means rigidly connecting the outer end of said arm to said supporting means, and spaced apart means arranged obliquely with respect to the vehicle longitudinal centerline pivotally connecting the inner end of said arm to said vehicle for swinging movement about a rearwardly and downwardly inclined projected axis passing vertically below the center of said universal connection between said half axle and said differential mechanism.

3. In a motor vehicle, a driving wheel, a half axle, means rigidly connecting the outer end of said axle to said wheel, a differential mechanism mounted on said vehicle, a universal joint drivingly connecting the inner end of said half axle with said differential mechanism, a wishbone suspension arm, means at the outer end of said arm rotatively supporting the outer end of said half axle and said wheel, spaced apart bearing means at the inner end of said arm, means operatively connecting said bearing means with said vehicle on a projected axis extending obliquely of the vehicle longitudinal centerline and converging therewith toward the rear, said axis being inclined in side elevation so as to intersect the vertical longitudinal plane of said wheel at a point horizontally aligned with the wheel center and to intersect a vertical plane passing transversely through the wheel center at a point spaced below said wheel center, and a spring disposed between said wishbone arm and said vehicle.

4. In a motor vehicle, a driving wheel, a half axle, means rigidly connecting the outer end of said axle to said wheel, a differential mechanism mounted on said vehicle, a universal joint drivingly connecting the inner end of said half axle with said differential mechanism, a wishbone arm, cylindrical means at the outer end of said arm rotatively supporting the outer end of said half axle and said wheel, a brake mechanism mounted on said cylindrical means and coactable with said wheels, spaced apart bearing means at the inner end of said arm, means operatively connecting said bearing means with said vehicle on a projected axis extending obliquely of the vehicle and passing directly vertically below said universal joint, said axis being inclined in side elevation so as to intersect the vertical longitudinal plane of said wheel at a point horizontally aligned with the wheel center and spaced substantially forwardly therefrom, whereby to provide a virtual torque arm effective upon application of said brakes to resist rear up of said vehicle.

5. In a motor vehicle, a frame, a differential mechanism, a support for said mechanism, means resiliently connecting said support to said frame, a pair of oppositely directed axles, each axle being universally connected at its inner end to said differential mechanism, a pair of road wheels rigidly connected, respectively, to the outer end of each swing axle, a pair of wishbone arms, a generally transversely extending cylindrical support secured to the outer end of each arm, bearing means in each support surounding the outer end of the adjacent half axle, a pair of spaced apart sleeve portions formed at the inner end of each arm, a pair of sleeve engaging portions secured to said frame at either side of the vehicle centerline, means pivotally connecting said sleeves with said sleeve engaging portions, said last mentioned means defining two rearwardly converging projected axes which pass respectively directly vertically below the universal connection for the associated axle, said axes being inclined downwardly and rearwardly so that the point of intersection thereof falls below and behind the geometric center of the differential mechanism, a spring disposed between each wishbone arm and said frame to resiliently support said vehicle relative to said wheels, and means associated with the outer end of each half axle whereby to accommodate slightly dissimilar angular movement of said axles and said wishbones resulting from displacement of said wheel to maximum compression and rebound positions.

6. In a motor vehicle, a frame, a differential mechanism, a transverse support for said mechanism, means resiliently connecting the opposite end of said support to said frame, a pair of oppositely directed swing axles, an axially movable universal joint operatively connecting the inner end of each axle with said differential mechanism, a mounting flange on the outer end of each axle, a pair of road wheels rigidly connected, respectively, to the mounting flange of each swing axle, a pair of wishbone arms, one on either side of the vehicle longitudinally centerline, a generally transversely extending cylindrical support integral with the outer end of each arm, bearing means disposed in each support and surounding the outer end of the adjacent half axle, a pair of spaced apart axially aligned sleeve portions formed at the inner end of each arm, a pair of sleeve engaging portions secured to said frame at either side of the vehicle centerline, means pivotally connecting said sleeves with said sleeve engaging portions, said last mentioned means defining two projected axes which converge rearwardly in plan view, said axes being inclined downwardly and rearwardly in side elevation so that the point of intersection thereof falls below and behind the geometric center of the differential mechanism, a spring disposed between the midportion of each wishbone arm and said frame to resiliently support said vehicle relative to said wheels, and means associated with the outer end of each half axle whereby to accommodate slightly dissimilar angular movement of said axles and said wishbones resulting from displacement of said wheel to maximum compression and rebound positions.

References Cited in the file of this patent

UNITED STATES PATENTS

| 2,044,196 | Alden | June 16, 1936 |
| 2,330,633 | Seyerle | Sept. 28, 1943 |
| 2,741,493 | Mathias | Apr. 10, 1956 |
| 2,757,747 | MacPherson | Aug. 6, 1956 |
| 2,815,084 | Fortgang | Dec. 3, 1957 |

FOREIGN PATENTS

| 412,506 | Great Britain | June 28, 1934 |
| 420,166 | Great Britain | Nov. 27, 1934 |
| 434,311 | Italy | Apr. 24, 1948 |